(12) United States Patent
Mantell (10) Patent No.: US 7,315,398 B2
(45) Date of Patent: Jan. 1, 2008

(54) MULTI-LEVEL ERROR DIFFUSION WITH COLOR IMAGE DATA

(75) Inventor: David A. Mantell, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 956 days.

(21) Appl. No.: 10/741,575

(22) Filed: Dec. 19, 2003

(65) Prior Publication Data

US 2005/0134921 A1 Jun. 23, 2005

(51) Int. Cl.
*H04N 1/52* (2006.01)
*H04N 1/56* (2006.01)
*H04N 1/58* (2006.01)

(52) U.S. Cl. .................... 358/1.9; 358/3.05; 358/3.21; 358/3.26; 358/534

(58) Field of Classification Search ................ 358/1.9, 358/3.01, 3.03–3.05, 3.21–3.22, 521, 530, 358/534, 3.06, 3.26; 382/251, 252, 237, 382/270, 162, 275

See application file for complete search history.

(56) References Cited

U.S. PATENT DOCUMENTS

| 4,680,645 | A | 7/1987 | Dispoto et al. |
| 4,733,230 | A | 3/1988 | Kurihara et al. |
| 5,307,425 | A | 4/1994 | Otsuka |
| 5,661,570 | A | 8/1997 | Nomura |
| 5,835,238 | A | 11/1998 | Mantell |
| 6,351,566 | B1 | 2/2002 | Zlotnick |
| 2005/0134920 | A1* | 6/2005 | Mantell .................... 358/3.03 |
| 2005/0135673 | A1* | 6/2005 | Mantell .................... 358/3.03 |
| 2005/0135674 | A1* | 6/2005 | Mantell .................... 358/3.03 |

* cited by examiner

*Primary Examiner*—Scott A. Rogers (57) ABSTRACT

A method for processing color image data to generate multi-level image data with arbitrary output levels and arbitrary level spacing. The method identifies a gray level spacing for each of a first and second color separation pixels and scales the gray level for each of the first and color separation pixels scaled to a common level spacing in relation to their corresponding gray level spacing. The scaled gray levels are then be thresholded to one of the two multi-level output values corresponding to the bounds of the gray level spacing.

22 Claims, 5 Drawing Sheets

MULTI-LEVEL ERROR DIFFUSION WITH COLOR IMAGE DATA

Cross reference is made to the following commonly assigned, related US Patent Application entitled "Image Processing Method for Generating Multi-Level Data," to David A. Mantell, application Ser. No. 10/741,806 filed Dec. 19, 2003.

The present application relates generally to methods for processing image data to convert a continuous-tone image to multi-level image data. The teachings herein have application to error diffusion processes adapted for converting a continuous-tone image to an image for use with a multi-level output display or printing device.

Digital images are commonly represented as one or more separations, with each separation conventionally represented as a monochromatic bitmap, which may be described as an electronic image with discrete signals or pixels defined by position and density. Monochromatic images typically are represented with a single separation while color images commonly are represented as two or more separations. In monochromatic and color applications, each separation commonly comprises a set of color density signals (pixels) for a given color wherein the density level (pixel value) is given as one of a number of possible levels. When a plurality of density levels are used, the density level (pixel value) may be referred to as the "gray level" without reference to the actual color. For example, in the case of a color image with three defining separations (e.g., Cyan, Magenta and Yellow), the gray levels (pixel values) for the Cyan separation simply identify the density of the cyan at the given location within the image.

Common input devices such as document scanners, computer imagery generators and digital cameras are capable of describing an image with a large number of gray levels representing a "continuous-tone" image. That is, each pixel of such a continuous-tone image has a value or gray level that lies in a particular range, with 256 or more gray levels for each separation being common. That is, if an 8-bit binary word represents such a pixel, the pixel can have 256 distinct color values. Output devices, including, for example, electostatographic printers, ink-jet printers, and LCD arrays, represent such an image by generating a plurality of picture elements or pixels on an output medium. Such output devices, however, typically provide only a few output levels or output states for each pixel.

Accordingly, before generating such an output image, the pixels within the continuous-tone image data are preprocessed by comparing the gray level of each pixel with one or a number of thresholds, to assign to each pixel one of a set of output states. The difference between the value (or gray level) of each pixel and the gray level corresponding to the output level (or output state) for the pixel introduces quantization artifacts into the printed image. Error diffusion is a well known technique of processing image data that attempts to maintain the total intensity or "gray content" of an image when converting an image comprising pixels having one set of gray levels to an image comprising pixels having a different set of gray levels. In general, error diffusion methods typically forwardly distribute fractional portions of the quantization error associated with a pixel to a selected group or set of neighboring pixels in an image. That is, the quantization error is diffused across the image. The fraction of the error added to each neighbor depends on a set of weights, the total error being multiplied by the weight corresponding to a given neighbor and then added to the value of that neighbor. The choice of weight can greatly affect the image quality, and much has been said about weights appropriate for giving pleasing results.

Error diffusion methods, however, can create a number of artifacts in the image. One such artifact, commonly referred to as "worms", become noticeable for relatively large regions of uniform or gradually varying color. The "worms" appear as curved or straight diagonal lines in areas of uniform gray or produce a patterned appearance in the image. Similarly, worms of holes (also referred to as worm holes) appear as patterns of curved or straight diagonal lines of white or lighter gray content in shadow regions.

One common and effective method to eliminate or reduce the occurrence of worms or worm holes in error diffused images, is through the use of stamp functions. Stamp functions operate to eliminate or reduce worms and/or worm holes in error diffusion by changing the threshold in the region around where a pixel is printed in a manner which will tend to suppress the clustering of like pixels over a wider region than is possible with a reasonable number of weights in the error distribution function. Briefly, with stamp functions the thresholds for quantization are dynamically adjusted in accordance with previous quantization results by adding a stamp array the thresholds to selectively control likelihood of whether the next pixel will exceed the threshold. That is, the stamp has the effect of locally changing the probability for a pixel to be set. In order to prevent the threshold function from growing too large (or too small) as well as limiting the extent of a stamp in the slow scan direction, the dampened threshold array of the previous scanline is used to generate the initial threshold values for the current scanline. The dampening ensures that the effect of an stamp is lost/dampened over a number of scanlines.

A more complete discussion of error diffusion methods, weighting coefficients and stamp functions can be found in the following references which are incorporated by reference herein for their teachings: U.S. Pat. No. 5,535,019, entitled "Error Diffusion Halftoning with Homogenous Response in High/Low Intensity Image Regions"; U.S. Pat. No. 5,353,127, entitled "Method for Quantization Gray Level Pixel Data With Extended Distribution Set"; U.S. Pat. No. 5,608,821 entitled "Method of High Addressability Error Diffusion"; U.S. Pat. No. 5,696,601 entitled "System and Method for Redistributing Error Values from an Error Diffusion Process"; U.S. Pat. No. 5,768,432 entitled "System and Apparatus for Pixel Growth Compensation in a Hybrid Error Diffusion Process"; and U.S. Pat. No. 6,608,700 B1 entitled "Removal of Error Diffusion Artifacts with Alternating Distribution Weights." It should be appreciated that the references cited above are but a small sample of the available error diffusion techniques known in the art and the teachings herein are not limited to the diffusion techniques shown therein.

In the case of color images, error diffusion should not simply be applied to each color component independently. To do so would produce noisy images. For example, a light blue can be produced by magenta and cyan pixels. But if the magenta and cyan are processed independently, then some pixels may have both magenta and cyan, yielding blue, while others have no ink at all, giving white. This mixture of white, blue, magenta and cyan will have more contrast and look noisier than pixels of magenta and cyan alone. The process of independently processing each channel can result in any and all of the possible color combination distributed over an image area.

The problem of image noisiness can be reduced by the method of vector error diffusion. In vector error diffusion colors are treated as points in a three dimensional space, with the colors printable or displayable at a given pixel discrete locations within that space. In a three color dimensional space, each of three axes define the position of the pixel. Each axes can take on a different component of the color definition, depending on the color space. In vector error diffusion, the error is given by the difference between the input color and the output color. The output color will usually be the closest reproducible color. Here, the "closeness" might be the simple distance in color space or a weighted distance based on the human visual model. A vector, defined in terms of direction and magnitude, defines the difference or error. The vector (error) is then diffused in the same way as in normal error diffusion.

Vector error diffusion, however, can be difficult to implement due to the difficult and resource intensive three dimensional vector calculation required to find the closest color at each pixel. That is, the method requires heavy computation in which vector quantization is used to calculate and compare 8 distance measurements when three output color components are used. To remedy the requirement to perform the significant vector calculation at each pixel, a semi-vector error diffusion approach can be used. With this approach, the two separations with the most visually perceptive color output are compared with one another to determine their output colors, while the third, least visually perceptive separation, is treated separately. That is, for image data in four planes: Cyan, Magenta, Yellow and black (CMYK), the algorithm would typically operate on the C and M separations.

Briefly, if the total image density from the combination of the C and M densities is above a first threshold density, then both C and M will be generated for that pixel location; if the total image density from the combination of the C and M densities is between the first threshold density and a second threshold density, the separation with the greater density will be generated; and if the total image density from the combination of the C and M densities is below the second threshold density, then neither C and M will be generated. A correction term may be applied to the yellow and/or black separations based on the color output of the first two separations to insure uniformity of ink coverage.

A more complete discussion of vector and semi-vector error diffusion methods can be found in the following references which are incorporated by reference herein for their teachings: U.S. Pat. No. 5,621,546, entitled "Method and Apparatus for Vector Error Diffusion with Output Color Control"; U.S. Pat. No. 6,014,233 entitled "Error Diffusion for Color Images with Semi-vector Quantization"; U.S. Pat. No. 6,072,591 entitled "Sum and difference error diffusion"; and U.S. Pat. No. 6,483,606 B1, entitled "Error Diffusion on Moderate Numbers of Output Colors." It should be appreciated that these references are just a sample of the available techniques known in the art and the teachings herein are not limited to the diffusion techniques shown therein.

Traditionally, printers and many display devices were binary. That is, for each particular pixel location within a separation there are two possible output states, either generate/print a dot or not. However, the use of multi-level output devices (e.g., devices which can generate two or more output densities or output states in addition to leaving a pixel location blank) has become conventional and more widespread. For example, liquid ink printers that can deposit multiple drops of a given ink at a given location as well as printers which include multiple densities of a given color (e.g., low density or high density cyan ink) for deposit at a given location have been used to obtain high quality images. While the error diffusion techniques such as those generally described above provide means for converting a continuous-tone image to an image for display or printing, which reduces artifacts in the printed image, they are not optimal for generating images for use with multi-level output display or print devices.

Moreover, there is always desired a method or system which provides an improvement on existing systems or methods of converting a continuous-tone image to a display image for printing. Such improvement may come in the form of improved performance, efficiency, and/or cost, and may include, but is not limited to one or more of reduced hardware or software complexity, reduced system resource requirements (e.g., processing and/or memory), increased speed, increased accuracy, etc.

In accordance with one or more aspects of the teachings herein, there is taught method for extending semi-vector error diffusion and stamp functions from binary applications to multi-level error diffusion with arbitrary levels and arbitrary level spacing. In accordance with another aspect of the teachings herein, there is disclosed an embodiment to extend binary error diffusion techniques to multi-level devices, with arbitrary level values, without introducing artifacts and preserving their image quality enhancements. In addition, in accordance with another aspect of the present teachings, there is shown multi-level error diffusion techniques that capture the speed enhancements inherent in multi-level error diffusion over higher resolution processing by performing calculations to a common spacing and subsequently scaling them to a given level spacing for output determination.

In accordance with one or more aspects of the teachings herein, there shown a method for processing image data comprising a plurality of pixels to generate multi-level data. The method receives an input pixel and identifies an upper bounding level and a lower bounding level for the input pixel wherein the upper bounding level and the lower bounding level defining a gray level spacing. The method the scales the gray level for the input pixel as a function of the gray level spacing; generates a reference threshold for the input pixel, the reference threshold being independent of the level spacing; and sets an output level for the input pixel based upon a comparison of the input pixel with the reference threshold, the output level being set to correspond to one of the upper bounding level and the lower bounding level.

In accordance with one or more aspects of the teachings herein, there shown a method for processing image data comprising a plurality of pixels, each pixel having an associated gray level. The method includes receiving an input pixel; identifying an upper bounding level and a lower bounding level based on the input pixel, the upper bounding level and the lower bounding level defining a gray level spacing; scaling a threshold value for the input pixel as a function of the gray level spacing; generating a reference threshold as a sum of the scaled threshold value and a level threshold, the level threshold being based on the gray level spacing; and setting an output level for the input pixel based upon a comparison of the input pixel with the reference threshold, the output level being set to correspond to one of the upper bounding level and the lower bounding level.

In accordance with one or more aspects of the teachings herein, there shown a method for processing color image data comprising at least a first color separation and a second color separation, wherein the first color separation includes a first color separation pixel and the second color separation includes a second color separation pixel. The method includes identifying a first upper bounding level and a first lower bounding level based on a gray level for the first color separation pixel; identifying a second upper bounding level and a second lower bounding level based on a gray level for the second color separation pixel; scaling a first modified gray level for the first color separation pixel to a common level spacing in relation to a first gray level spacing defined by the first upper bounding level and the first lower bounding level to generate a first scaled gray level; scaling a second modified gray level for the second color separation pixel to the common level spacing in relation to a second gray level spacing to generate a second scaled gray level, the second gray level spacing being defined by the second lower bounding level and the second upper bounding level; generating a sum S of the first scaled gray level and the second scaled gray level; and deriving a first output value for the first color separation pixel and a second output value for the second color separation pixel based on the sum S.

In accordance with one or more aspects of the teachings herein, there shown a method for processing color image data including a first color separation pixel and a second color separation pixel. The method comprises identifying first upper and lower bounding levels and second upper and lower bounding levels, the first upper and lower bounding levels being based on the first color separation pixel and the second upper and lower bounding levels being based on the second color separation pixel; scaling an input gray level for the first color separation pixel to a common level spacing in relation to a first gray level spacing to generate a first scaled gray level, the first gray level spacing being defined by the first upper bounding level and the first lower bounding level; generating a sum S of the first scaled gray level and a second scaled gray level, the second scaled gray level being derived from the second color separation pixel; and quantizing the input gray level for the first color separation pixel to a first output value based on the sum S.

The teachings and embodiments disclosed herein may be described with reference to the accompanying drawings, which are provided for purposes of illustrating various aspects of the teachings and embodiments and are not to be construed as limiting the same, wherein.

The present description is directed in particular to elements forming part of, or cooperating more directly with an apparatus for or method of processing image data in accordance with teachings and embodiments disclosed herein. It is to be understood that elements not specifically shown or described may take various forms well known to those skilled in the art.

Figure 1:
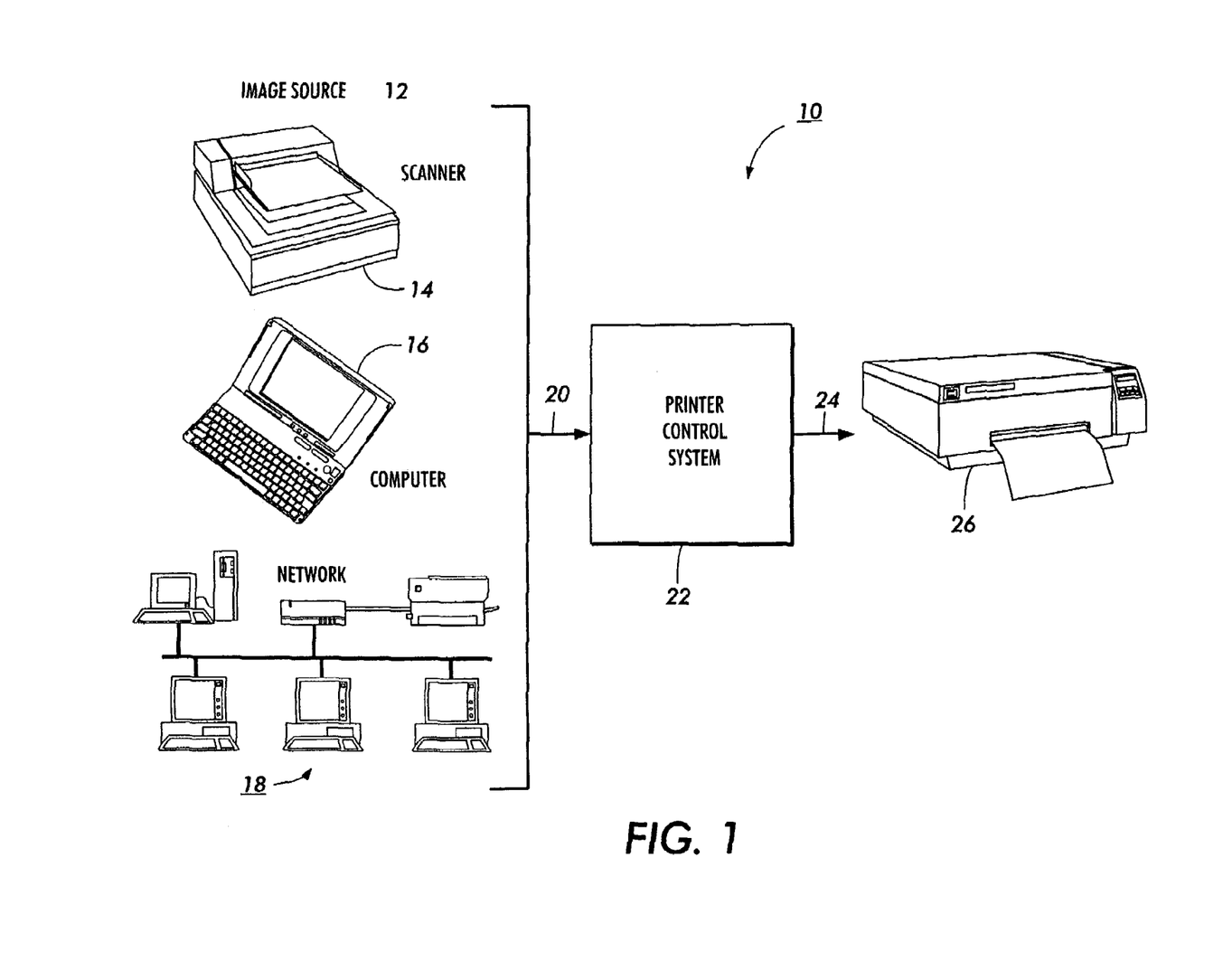
FIG. 1 shows an embodiment of an exemplary printing system which incorporates one or more of the teachings disclosed herein.

Turning now to FIG. 1, there is shown an embodiment of an exemplary printing system 10 that incorporates the features disclosed herein. Printing system 10 includes image source 12 that may include scanner 14, computer 16, network 18 or any similar or equivalent image input terminal providing image data 20 which may be any combination of ASCII data, bitmapped image, scanned image data, pixel image data, geometric data, graphics primitives, page description language, etc. Image data 20 is supplied to image processing system 22 which processes the received image data 20 to produce print data 24 that drives image output terminal (IOT) 26.

In one embodiment, image processing system 22 may comprise what is commonly referred to in the art as a print driver. Image processing system 22 may also comprise a digital front end or similar controller driving IOT 26. Those skilled in the art will recognize that image processing system 22 may be implemented in hardware and/or software and may reside within image source 12, within printer 26, within a separate component or in any combination thereof. In response to print data 24, which may comprise image data and/or printer control signals (e.g., paper handling, finishing options, carriage control, ink deposition), printer 26 generates an output image on a suitable medium (e.g., print or display).

It will become evident from the following discussion that IOT 26 may comprise any one of a number of printing devices including, but not limited to, electrostatographic printers (e.g., laser, electrophotographic, ionographic), liquid ink printers (e.g., drop-on-demand; phase change wax-based; piezoelectric, acoustic, or thermal inkjet), etc. Furthermore, the teaching are not limited in there application to copying and printing machines and may be incorporated in other output devices such as electronic display systems including CRTs, LCDs, LED, etc.

Aspects of the teachings and/or embodiments discussed herein are generally useful as features or characteristics of image processing system 22 depicted in FIG. 1; however, the teachings and embodiments disclosed herein are not limited in their application to such a system.

Figure 2:
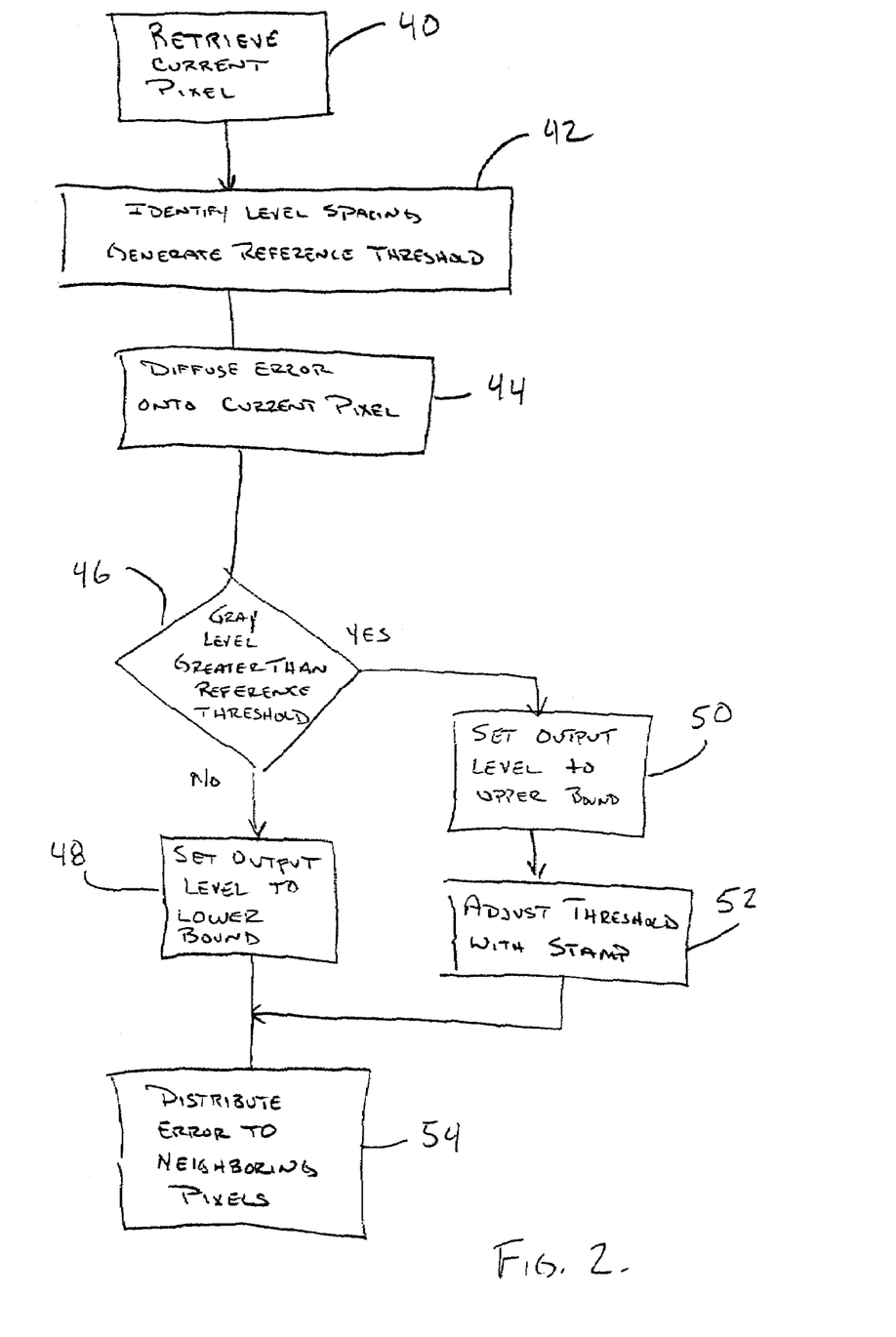
FIG. 2 is a flow chart illustrating various steps in one embodiment of a method for converting a continuous tone image to a multi-level image employing multi-level error diffusion with a stamp function.

Turning now to FIG. 2, there is shown a flowchart of an embodiment of a method for converting a continuous-tone image into a multi-level image. In the present description, the continuous-tone image can be considered as a set of pixels arranged in an array of m scanlines with each scanline containing n pixels, each of which is defined at a single gray level or optical density within a set of possible optical density or gray levels (e.g., 0 to 255 using 8-bits per pixel). Each pixel can be processed in the manner described below, to redefine each pixel in terms of a new, smaller set of 'h' available output levels wherein h>2. For purposes of description, each pixel in the continuous-tone image can be considered to be one of 255 gray levels wherein a gray level of 255 corresponds to 100% density (e.g., black) and a gray level of 0 corresponds to a 0% density (e.g., white). However it should be appreciated that the continuous-tone image can a different number of levels and is not limited to 255 gray levels. Moreover, the illustrative method can be readily adapted to applications wherein a gray level of 255 corresponds to an output density of 0 while a gray level of 0 corresponds to an output density of 100%.

Briefly, the illustrative method of FIG. 2 begins with the retrieval of the gray level for a current pixel from the continuous-tone image. Based on the gray level for the current pixel, a gray level spacing is identified and a reference threshold comprising the sum of a level threshold and a scaled threshold value from an array of threshold values is obtained. Additionally, a modified gray level is obtained by adding any error diffused to the current pixel to the gray level for the current pixel. The modified gray level is compared to the reference threshold to obtain an output level for the current pixel. As will be described below, the method selects an output level that corresponds to one of the two gray levels defining the gray level spacing for the current pixel. More specifically, if the modified gray level is greater than the reference threshold an output level corresponding to the larger of the two gray levels is selected and if the input gray level is within a gray level range wherein worms may appear (typically highlights), a stamp function is added to the array of threshold values. The method also obtains the difference between the gray level of the current pixel and that of the output level as an error value. Subsequently, distributed or diffused errors are calculated from the error value using any well known error distribution process.

Briefly reviewing, in a binary error diffusion operation, an input gray level is compared to a reference signal comprising the sum of an initial threshold and a threshold value corresponding to the current pixel selected array of threshold values. The array of threshold values is independent of the spacing between the two gray levels. Thus, when a subsequent point is processed that is between two different gray levels the threshold array can still be used by either scaling to the level spacing of the two levels or by scaling the input to a level consistent with the threshold array. When the input gray level is greater than the reference signal, the output state corresponding to printing a pixel is selected and the array of threshold values is modified by a function given by the input gray level and/or the output level. Stamp functions, which can be used to reduce worms are one example of such a threshold function.

As with binary error diffusion, in multi-level error diffusion the modified gray level is compared to a reference threshold comprising the sum of a level threshold and a scaled threshold value from an array of threshold values as modified by any added functions such as stamp function. However, when considering a multi-level error diffusion operation that is valid for arbitrary gray level spacing and thus arbitrary output levels (output states) and level spacing, a threshold array must be effective both for output levels having a large level spacing and output levels separated by a small level spacing. Similarly, the function might be applied to a large level spacing as well as a small level spacing. Further, both the threshold array and function must be effective wherein the level spacings are much smaller than the present value of the threshold array or stamp function.

To extend such functions to multi-level error diffusion with arbitrary output levels and level spacing, the embodiment of FIG. 2, uses threshold values and functions that are scaled in relation to the level spacing. A common array of threshold values T and for example a set of stamp functions S which are scaled to the given level and level spacing can be used. That is, the array of threshold values T and stamp functions S are the same as or comparable to those array of threshold values and stamp functions used in binary error diffusion; however, the method scales the threshold values and stamps in relation to the level spacing. In the illustrative method of FIG. 2, the current level spacing is determined based on the input gray level for the current pixel; however, it should be understood that the current level spacing can be determined based other values such as the modified gray level (the input gray level and diffused error). Moreover, the current level spacing can be determined based other gray levels such as a gray level adjusted by the addition of a portion of the distributed or diffused error.

At a step 40, a pixel is retrieved from the set of pixels comprising the continuous-tone image. In one embodiment, the continuous-tone image comprises an array of pixels and step 40 retrieves a gray level for the pixel from scanline m and column n i.e., i(m,n). The pixels may be retrieved in a sequential manner, for example in a raster pattern (pixels are retrieved in each line sequentially from left to right with the lines selected in a top-to-bottom order) or a serpentine pattern (pixels are retrieved in each line sequentially in a given order with the given order alternating between left to right and right to left as the lines selected in a top-to-bottom order). However, it should be appreciated that the pixels can be retrieved in any order and do not need to be limited to the patterns described above.

Having obtained the gray level i(m,n) for the current pixel, a current gray level spacing is identified and a reference threshold comprising the sum of a level threshold and a scaled threshold value from an array of threshold values is obtained (step 42). If pixels within a continuous-tone image are redefined in terms of one of h≧2, any given input gray level i(m,n) will be within a range of gray levels bounded by gray levels $L_S$ and $L_B$, i.e., $L_S < i(m,n) \leq L_B$; wherein $L_S$ and $L_B$ identify the smaller ($L_S$) and bigger ($L_B$) of the two gray levels that bound the input gray level i(m,n) and wherein each of the bounding gray levels correspond to a possible output state (output level). Moreover, the difference of $L_S$ and $L_B$ will define the gray level spacing for the current pixel, wherein the gray level spacing identifies the number of different gray levels within the range defined by $L_S$ and $L_B$. Thus, for any given input pixel having an associated gray level there will exist two bounding gray levels $L_S$ and $L_B$ that correspond to possible output states and that define a bounded range identifying the gray level spacing in which the given pixel resides.

Given the current gray level spacing defined by levels $L_S$ and $L_B$, a level threshold $T_0$ which provides the base or starting threshold for that gray level spacing can be defined. The level thresholds for each of the gray level spacings can be predefined and stored in one or more arrays. Moreover, a level threshold $T_0$ can be generated for any arbitrary levels $L_S$ and $L_B$ according a defined relationship. An example of a typical relationship defining the level threshold based on the input gray level is $T_0 = L_S + (L_B - L_S)/2$. Wherein $L_S$ and $L_B$ define the output levels and level spacing for the current input pixel gray level i(m,n). As should be appreciated a different set of level thresholds or defined relationship can be used for each color separation and/or for different image types can also be defined.

As described above, the illustrative method can employ a common array of threshold values T that is the same as or comparable to the array of threshold values used for binary error for multi-level error diffusion with arbitrary output levels and level spacing by scaling the threshold values to common size in relation to the level spacing. The threshold values can be stored in a threshold array T(l), wherein l is the pixel index along the scanline. Furthermore, it should be appreciated that a different threshold array T may be used for each color separation and/or for different image types. Any known method for selecting or determining threshold values can be used to obtain the threshold values T(l). Given arbitrary levels $L_S$ and $L_B$, the threshold value T(l) for a current pixel can be scaled to a common size for any given level spacing according to:

$$T^*(l) = T(l)(L_B - L_S)/c \qquad (1)$$

wherein T(l) is the threshold value for the current pixel, $L_S$ and $L_B$ are the gray levels and level spacing given the gray level for the current pixel i(m,n), and c is the number of available gray levels (gray level spacing) in the continuous-tone image (c=255 in the present example). Having identified a level threshold $T_0$ and scaled threshold $T^*(l)$, it is possible to establish the reference threshold $T_R$ as the sum of $T_0$ and $T^*(l)$, i.e., $T_R=T_0+T^*(l)$.

In a step 44, the total distributed error e(m,n) diffused onto the current pixel as a result of prior thresholding and diffusion processing is added to the gray level for the current pixel i(m,n) to obtain modified pixel gray level i'(m,n). At a step 46, the illustrative method compares the modified gray level for the current pixel i'(m,n) to the reference threshold $T_R$ to obtain the output level. If the modified gray level i'(m,n) is less than the reference threshold $T_R$, the output level (output state) is set to a value corresponding to $L_S$ at a step 48. If the modified gray level i'(m,n) is greater than the reference threshold $T_R$, the illustrative method sets the output level to a value corresponding to $L_B$ (step 50).

It should be appreciated that in the illustrative method, the output level (output state) is limited to correspond to $L_S$ or $L_B$ regardless of the modified gray level. As described above, in the illustrative method, the bounding gray levels $L_S$ and $L_B$ are determined using the input gray level i(m,n) for the current pixel; however, as discussed above, it should be understood that the bounding gray levels can also be determined from the modified gray level i'(m,n) or an adjusted gray level i*(m,n). The determination of whether the input gray level, the modified gray level or an adjusted gray level will be used to set the bounding gray levels $L_S$ or $L_B$ may be impacted by a number of factors, including for example, other image processing employed (e.g., edge enhancement, antialiasing, edge smoothing), image type (e.g., halftone, graphics, text), output device type (e.g., liquid ink or electrophotographic), etc. In general the bounding gray levels that provide the overall desired output quality will be used. The overall desired output quality can be analyzed by generating output image using bounding levels set by the input or the modified gray level with a given output device and image processing options.

When modified gray level i'(m,n) is greater than the reference threshold $T_R$ and the input gray level i(m,n) is in a gray level range in which worms are likely to appear, the illustrative method increments the array of threshold values T with a stamp function S(x) based on the size of the current gray level in relation to the gray level spacing at a step 52. A set of stamp functions S which can be applied to any arbitrary gray level spacing defined by $L_S$ and $L_B$ is obtained by defining the set based on the relation of the input gray level to the gray level spacing. Thus, wherein the binary case the stamp function is typically a function of the input gray level, the illustrative method employs a stamp function S(x) that is selected based on the relation of the input gray level to the gray level spacing by according to:

$$x=c(i(m,n)-L_S)/(L_B-L_S) \quad (2)$$

wherein i(m,n) is the gray level of the current pixel, $L_S$ and $L_B$ are the output levels defined by the gray level of the current pixel, and c is the number of gray levels in the continuous-tone image.

At a step 54, the illustrative method diffuses a quantization error associated with the current pixel to a selected group of neighboring pixels in the image. As will be appreciated, the neighboring pixels are not limited to those pixels which are directly adjacent to the current pixel but can include other pixels as well. The determination and distribution (diffusion) of the quantization error can be accomplished using any common error diffusion technique available. Briefly, such error diffusion techniques typically obtain the quantization error based on a difference between the gray level of the current pixel i(m,n) and the gray level corresponding to the output level (output state) selected for the current pixel. The techniques typically distribute a weighted fractional portion of the quanitzation error to each of selected group of neighboring pixels. The group of neighboring pixels receiving a weighted error as well as the weighting coefficients can remain constant or be dynamically modified. The weighted fractional portions are often selected such that their sum is one; however, those skilled in the art will recognize that such condition is not necessary.

After the n pixels within a current scanline have been processed, and before beginning processing of the next scanline, the illustrative method resets the values in the threshold array in a step 56. In one embodiment, the method resets the values in the threshold array as a weighted (or decayed) function of the threshold values for the current scanline. This weighting or decay is designed to prevent the threshold values from growing too large as well as limiting the extent of a stamp in the slow scan direction such that the effect of the stamp functions is lost/dampened over a number of scanlines. That is, the threshold values for the next scanline are reset according to $T(l)=T(l)^*W$, wherein W is the weighting or dampening value which is typically less than or equal to one ($0 \leq W \leq 1$). Moreover, an alternatives exist to resetting a threshold array based on the current values resets the threshold values in the array to a defined set of initial values prior to processing each scanline.

Figure 3:
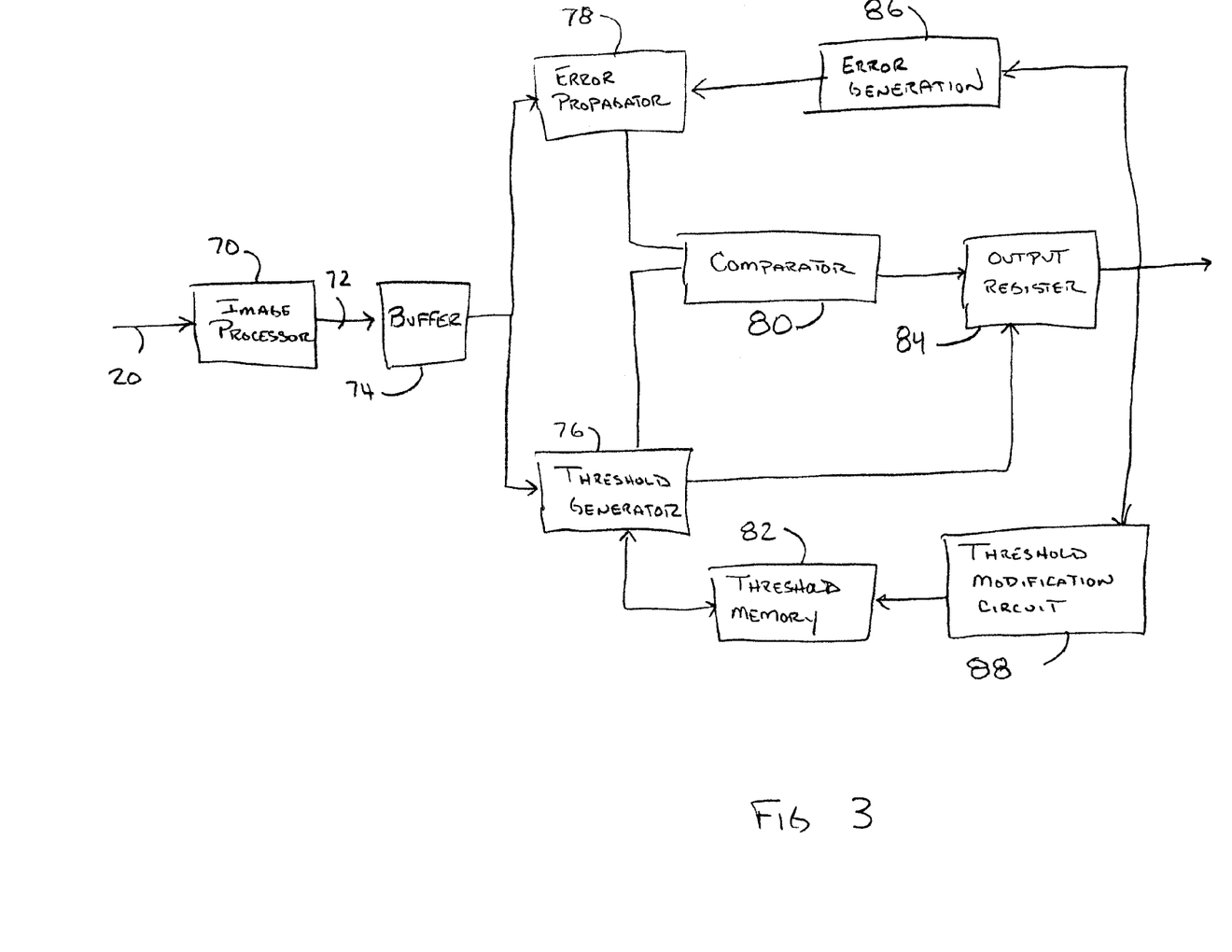
FIG. 3 shows an embodiment of a circuit for implementing stamp functions in a multi-level error diffusion operation having arbitrary levels and arbitrary level spacing.

Turning now to FIG. 3, there is shown the data flow through an embodiment of a processing circuit for implementing threshold functions in a multi-level error diffusion operation having arbitrary levels and arbitrary level spacing. Digital image data 20 which may comprise one or more forms of data including, for example, ASCII data, bitmapped image, scanned image data, pixel image data, geometric data, graphics primitives, page description language (PDL), etc. is received at image processor 60. After receipt, image processor 60 employs any of a number of well known image processing operations to process digital image data 20 into processed image data 62. For example, processor 60 may operate to decompose a PDL file or other image format information and process the image data in accordance with such information. As discussed herein, Image processor 60 provides image data 62 in terms of one or more color separations wherein each of the separations include pixel data for a plurality of pixels arranged in 'm' rows and 'n' columns. The gray level at each pixel location (m,n) of the image data is defined with 8 bits (e.g., c=255); however, it is understood that the gray level of the pixels can be defined by any number of bits/pixel.

Image data 62 is supplied to a memory circuit 64. Memory circuit 64 includes an image buffer and a memory controller which operates to address the image buffer to introduce image data (gray level) pixel by pixel to the remaining portion of the circuit for processing. The gray level i(m,n) of the input pixel introduced to the circuit is supplied to a threshold generator 66 and an error propagator 68. Error propagator 68 generates a modified gray level i'(m,n) as the sum of the input gray level i(m,n) and error e(m,n) diffused onto the pixel at row m and column n as a result of prior thresholding and diffusion processing. The modified gray level i'(m,n) is supplied to a threshold comparator 80.

Threshold generator 66 receives the input gray level i(m,n) and generates a reference threshold $T_R$ which is supplied to threshold comparator 80. More specifically, threshold generator 66 operates to determine the gray level spacing defined by the upper an lower bounding gray levels $L_S$ and $L_B$ corresponding to the input gray level i(m,n). The bounding levels $L_S$ and $L_B$ are supplied to output register 74 which identifies the output levels corresponding to the bounding levels. Having identified the gray levels $L_S$ and $L_B$ defining the gray level spacing, threshold generator 66 obtains a level threshold $T_0$ for the gray level spacing and retrieves the threshold value T(l) for the input pixel from the array of threshold values maintained in memory 72. The threshold value T(l) is scaled in relation to the level spacing and the threshold is added to the level threshold $T_0$ to establish the reference threshold $T_R$.

Threshold comparator 70 compares the modified gray level i'(m,n) to the reference threshold $T_R$ to determine an appropriate output level (output state) to be transmitted to an image output terminal. More particularly, based upon the comparison of the modified gray level i'(m,n) and the reference threshold $T_R$, comparator 70 generates a selection signal supplied to output register 74. In response to the selection signal, output register 74 provides an output signal having the appropriate output level for the input pixel to the IOT.

The output signal is also provided to error generation circuit 76 and threshold modification circuit 78. Error generation circuit 76 generates an error indicative of the difference between a gray level of input pixel value and the gray level of the output signal. Based upon this error measurement, circuit 76 redistributes or diffuses the error to a selected group of unprocessed neighboring pixels within image in accordance with a set of error weighting coefficients. If the output signal corresponds to $L_B$, threshold modification circuit 78 applies a stamp function to the threshold array in memory 72. The threshold modification circuit 78 applies a stamp function S(x) that is selected based on the relation of the gray level of the input pixel to the gray level spacing defined by $L_S$ and $L_B$.

Figure 4:
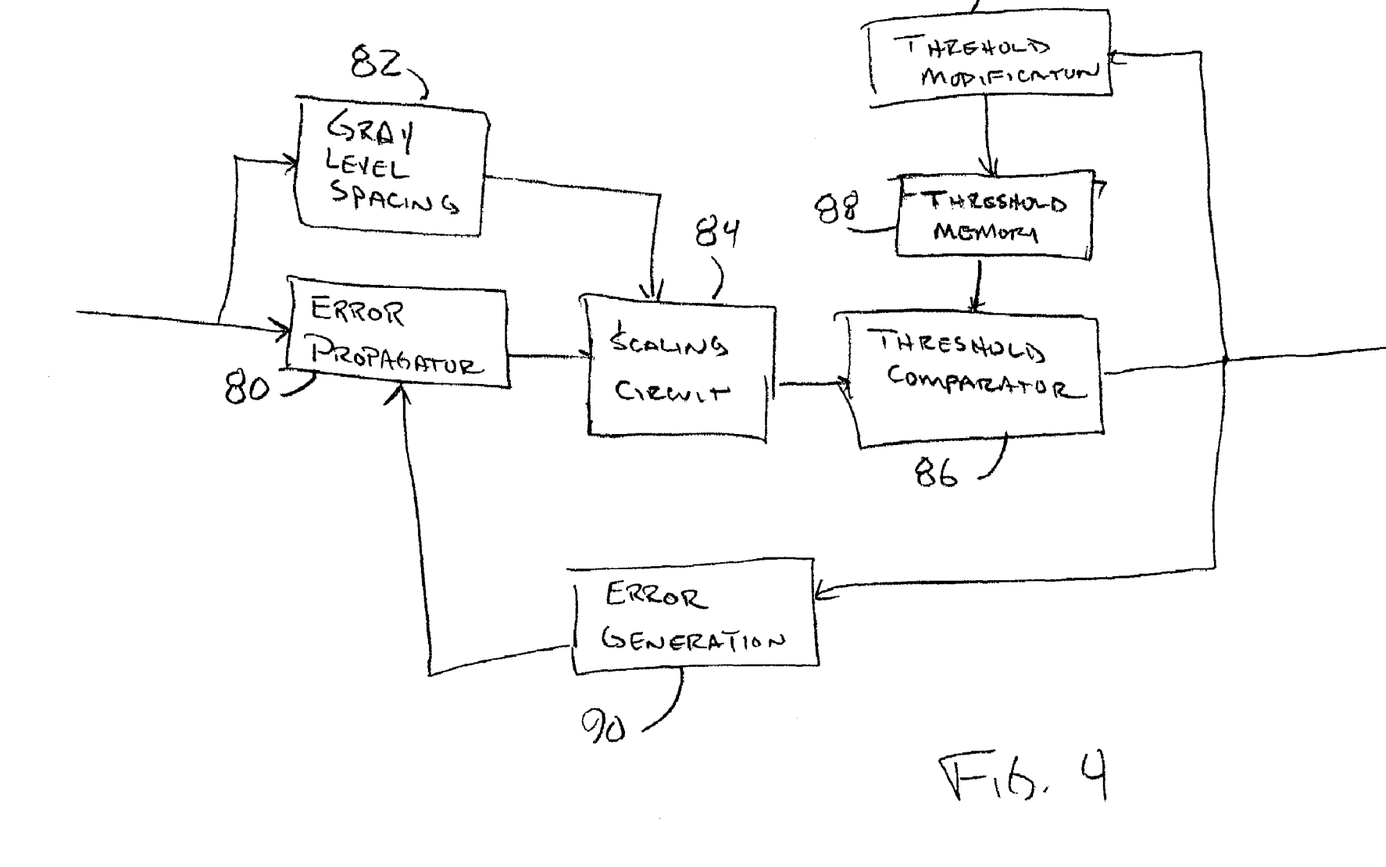
FIG. 4 illustrates an embodiment of a system for implementing stamp functions in a multi-level error diffusion operation having arbitrary levels and arbitrary level spacing and FIG. 5 shows an embodiment of an image processing system including an operation for multi-level error diffusion with semi-vector quantization.

In the above described embodiments, the threshold value T(l) for the input pixel and the stamp function S(x) were scaled to the a gray level spacing for the input pixel defined by lower and upper bounding levels $L_S$ and $L_B$. However, the multi-level error diffusion can also operate by scaling the modified gray level for the input pixel i'(m,n) to a common level spacing based on the gray level spacing. FIG. 4, illustrates the data flow through an embodiment of a system for implementing threshold functions in a multi-level error diffusion operation having arbitrary levels and arbitrary level spacing.

In the embodiment of FIG. 4, image data is supplied pixel by pixel to the system. The gray level i(m,n) of the input pixel introduced to the circuit is supplied to error propagator 80 and gray level spacing circuit 82. Error propagator 80 generates a modified gray level i'(m,n) as the sum of the input gray level i(m,n) and the distributed error e(m,n) diffused onto the pixel at row m and column n as a result of prior thresholding and diffusion processing. The modified gray level i'(m,n) is supplied to scaling circuit 84.

Gray level spacing circuit 82 operates to determine the gray level spacing based on the input gray level i(m,n). The gray level spacing is defined by upper and lower bounding gray levels $L_S$ and $L_B$ each of which correspond to possible output states and define a bounded range identifying the gray level spacing in which the given pixel resides. As discussed above, the gray level spacing can be defined by other gray levels. For example, by supplying the distributed error e(m,n) to the gray level spacing circuit 82 in addition to the error propagator 80, the gray level spacing circuit 82 can identify the upper an lower bounding gray levels $L_S$ and $L_B$ based on a modified gray level (the input gray level and diffused error) or an adjusted gray level (the input gray level and a portion of the diffused error).

The bounding gray levels $L_S$ and $L_B$ are supplied to scaling circuit 84. The scaling circuit operates to scale the modified gray level i'(m,n) for the input pixel to a common level spacing in relation to the gray level spacing. That is, level scaling circuit receives bounding levels $L_S$ and $L_B$ defining the gray level spacing for the input pixel and scales the modified gray level to a common spacing in relation to the gray level spacing according to:

$$i^* = (i'(m,n) - L_S)c/(L_B - L_S) \qquad (3)$$

wherein $L_S$ and $L_B$ are the bounding gray levels defining the gray level spacing, i'(m,n) is the modified gray level and c is the number of available gray levels (gray level spacing) in the common level spacing.

The scaled gray level i* is supplied to threshold comparator 86. Threshold comparator 86 compares the scaled gray level i* to a threshold retrieved from memory 88 to determine an output. Threshold comparator 86 can use any conventional thresholding operation. Moreover as the input level is scaled to a common spacing in relation to the level spacing, the same threshold or set of thresholds can be applied to any given input. That is, the threshold is calculated independent of the level spacing. In one embodiment the scaled gray level i* is compared to a reference threshold comprising the sum of a base threshold and a threshold value T(l) for the input pixel, wherein l is the pixel index along the scanline. Memory 88 stores the array of threshold values T which can comprise the same or similar values to those array of threshold values used in binary error diffusion. Furthermore, it should be appreciated that a different threshold array T may be used for each color separation and/or for different image types. Any known method for selecting or determining threshold values can be used to obtain the threshold values T(l).

Based on the comparison, threshold comparator 86 determines an appropriate output level (output state) to be transmitted to an image output terminal. More particularly, if the scaled gray level i* is less than the threshold T(l), the output level is set to a value corresponding to the gray level of $L_S$. If the scaled gray level i* is greater than the threshold T(l), the output level is set to a value corresponding to $L_B$.

The output level generated by threshold comparator 86 is provided to error generation circuit 90 and threshold modification circuit 92. Error generation circuit 90 generates an error indicative of the difference between a gray level of input pixel value and the gray level of the output level. Based upon this error measurement, circuit 90 redistributes or diffuses the error to a selected group of unprocessed neighboring pixels within image in accordance with a set of error weighting coefficients. If the output level corresponds to $L_B$, threshold modification circuit 92 applies a stamp function to the threshold array in memory 88. More particularly, the threshold modification circuit 92 applies a stamp function S(i*) that is selected based on the relation of the scaled gray level to common level spacing. The set of stamp functions S can be the same as or comparable to the stamp functions used in binary error diffusion.

While the above discussion has focused on reducing or eliminating worms by applying a stamp function to a threshold array when the output level corresponds to the upper bound $L_B$ and the input level corresponds to a highlight region, the above techniques work equally well for worm holes in dark or shadow regions. As discussed above, worm holes appear as patterns of curved or straight diagonal lines of white or lighter gray content in shadow regions. In the multi-level case these patterns correspond to output levels set to a value corresponding to the lower bound $L_S$. Thus, if the output level is set to a value corresponding to the lower bound $L_S$ and the input gray level is in a gray level range corresponding to a shadow, the stamp function is applied to the threshold array. To eliminate of reduce the occurrence of holes, the stamp function is designed to encourage the generation of an output rather than suppressing the output. Thus, the stamp function is designed and operates to lower the thresholds in areas near a hole. As should be appreciated this can be accomplished by adding a stamp function having negative values or subtracting the stamp function.

Figure 5:
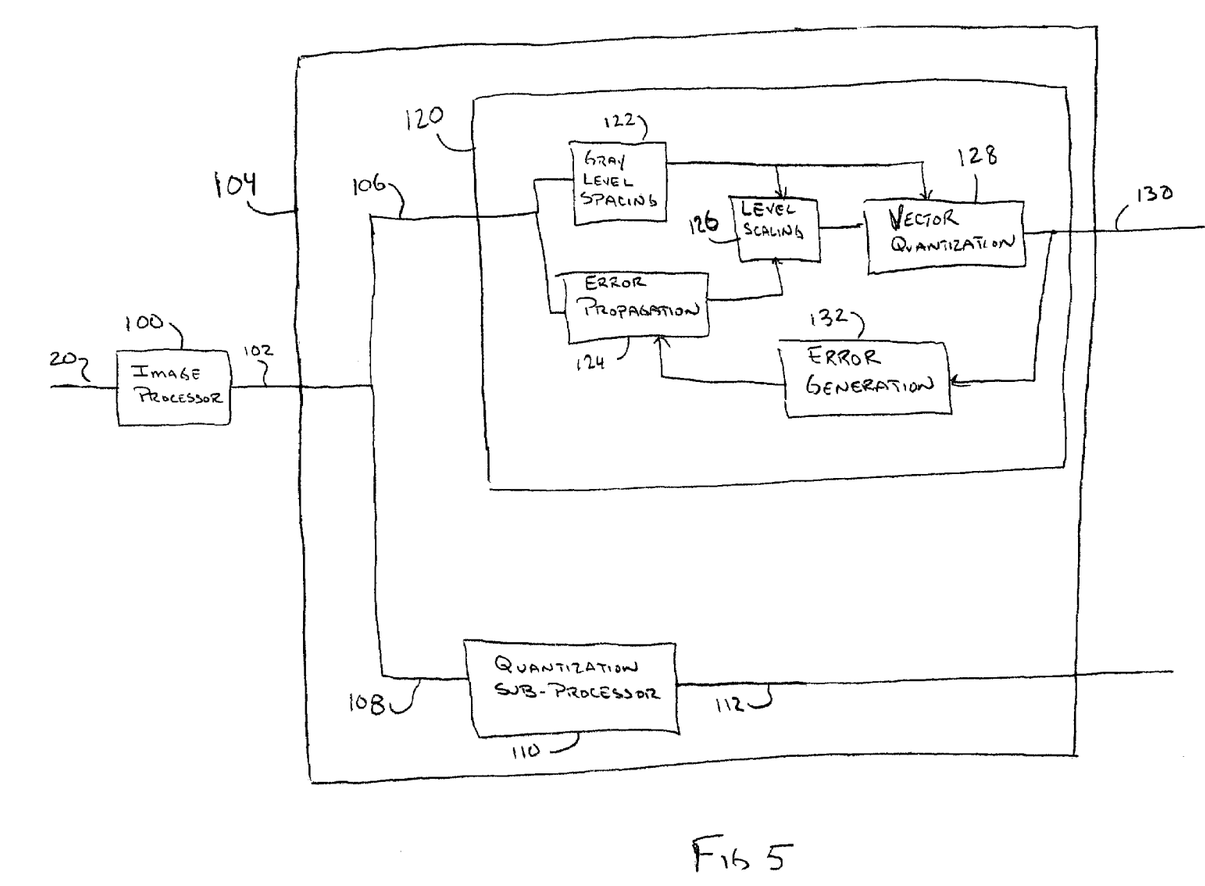

Turning now to FIG. 5, there is shown a block diagram depicting the data flow in an embodiment of an image processing system including an operation for multi-level error diffusion with semi-vector quantization. As will be discussed in more detail below, the multi-level error diffusion with semi-vector quantization is applicable for arbitrary gray levels and arbitrary gray level spacing. In the course of processing the digital image data, including other processes (not shown) that operate on the image data, the image processing system preferably operates to transform digital image data 20 into print ready image data for transfer to an IOT for output on tangible media (e.g., print or display). Although other image processing operations may be conducted within the image processing system, the present discussion includes those aspects directed to color-correlated or vector error diffusion with multi-level outputs. For this discussion the term vector will refer to a color error diffusion algorithm in which some or all of the color planes dependent on the output of other color planes when processed.

In FIG. 5, digital image data 20 is received at image processor 100 which employs any of a number of well known image processing operations to process digital image data 20 into processed image data 102. For example, processor 100 may operate to decompose a PDL file or other document information and process the image data in accordance with such information. For purposes of discussion, image processor 100 provides image data 102 in terms of a plurality of color separations (e.g., CMY) wherein each of the separations includes pixel data for a plurality of pixels arranged in 'm' scanlines and 'n' pixels per scanline. It is understood that the gray level of the pixels can be defined by any number of bits/pixel and that each separation is not required to have the same number of gray levels.

Those skilled in the art will recognize that the image data supplied to processor 100 may be provided in any suitable color space, and that conversions may be readily made between various color spaces. That is, the image data may be supplied in terms of RGB, Lab, YCrCb or any other color space, and processor 100 may convert the data to cyan, magenta, yellow (CMY) space in any known manner.

Continuous tone image data 102 is supplied to diffusion processor 104. More specifically, image data 106 corresponding to two of the separations comprising image data 102 is supplied to a vector error diffusion sub-processor 120 and image data 108 corresponding to the remaining separations, are supplied to a qauntization sub-processor 110. Briefly reviewing, in order to yield the least perceptual noise in an output image it is known that quantization should be performed in perceptually orthogonal color spaces as this allows for the color components to be treated separately. Moreover, the lightness component should be treated differently than the chroma components to produce better quality and less noisy color images. Thus, the least visual impact on the color image is obtained when the quantization of the darkest color components are coordinated with one another and the lightest color component(s) are treated independently. The present example uses CMY color components; however, any color space with substantially orthogonal components may be used. When using CMY color components, yellow is the lightest color and is processed independently of the darker cyan and magenta components. That is, to provide images with lower perceptual noise the image data in the cyan and magenta separations are processed together in sub-processor 120 and the yellow separation is processed independently in sub-processor 110.

The image data may be supplied on a pixel by pixel basis, wherein the pixels are supplied sequentially in a raster pattern (pixels are retrieved in each line sequentially from left to right with the lines selected in a top-to-bottom order) or sequentially in a serpentine pattern (pixels are retrieved in each line sequentially in a given order with the given order alternating between left to right and right to left as the lines selected in a top-to-bottom order). However, it should be appreciated that the pixels can be supplied in any order and are not limited to being supplied sequentially or being supplied in the patterns described above. The separations sent to sub-processor 110 and sub-processor 120 may be selected in a manner such that the quantization of the darker color components can be coordinated.

In sub-processor 120, image data 106 comprising the gray levels of the input pixels of, for example, the cyan and magenta separations (C(m,n) and M(m,n)) are received at gray level spacing circuit 122 and error propagation circuit 124. In addition to the gray levels C(m,n) and M(m,n) for the input pixels for the cyan and magenta separations, error propagation circuit 124 also receives the distributed errors $E_C(m,n)$ and $E_M(m,n)$ for the previously processed cyan and magenta separations, respectively. Propagation circuit 124 adds the distributed errors $E_C(m,n)$ and $E_M(m,n)$ to the input gray levels C(m,n) and M(m,n) received as image data 106 to obtain modified gray levels C'(m,n) and M'(m,n) which are supplied to level scaling circuit 126.

Gray level spacing circuit 122 identifies, for each input pixel, the bounding gray levels $L_S$ and $L_B$ corresponding to possible output states (output levels) for the given separation that bound the input gray levels. The bounding gray levels for each separation are supplied to level scaling circuit 126 and vector quantization circuit 128. As discussed above, the gray level spacing need not be defined by the input gray levels. For example, by modifying the sub-processor 120 to supply the distributed errors $E_C(m,n)$ and $E_M(m,n)$ to the gray level spacing circuit 122 (in addition to error propagation circuit 124), the gray level spacing can be based on a modified gray level (the input gray level and diffused error) or an adjusted gray level (the input gray level and a portion of the diffused error).

Level scaling circuit 126 receives the bounding gray levels and the modified gray levels C'(m,n) and M'(m,n) and scales the modified gray values in relation to the level spacing to obtain scaled gray levels $C_{adj}$ and $M_{adj}$ for the cyan and magenta separations. The scaled gray levels $C_{adj}$ and $M_{adj}$ are supplied to vector quantization circuit 128. Vector quantization circuit 128 receives the scaled gray levels $C_{adj}$ and $M_{adj}$ and derives an output signal 130 comprising multi-level output values $O_C(m,n)$ and $O_M(m,n)$ for the cyan and magenta separation pixels based on a sum of the scaled gray levels. Output signal 130 can be used to drive an image output terminal to print or display cyan and/or magenta on suitable media based on multi-level output values for the cyan and magenta separation pixels. Optionally, output signal 130 is further supplied to error generation circuit 132.

Error generation circuit 132 generates an error indicative of the difference between gray level of input pixel value and the gray level of the multi-level output value for the cyan and magenta separation pixels. Based upon this error measurement, circuit 132 redistributes or diffuses the error to a selected group of unprocessed input pixels within image data 106 in accordance with a set of error weighting coefficients.

The operation of sub-processor 120 can be shown by way of an illustrative example. Recall that image data 106 comprising the input gray levels C(m,n) and M(m,n) for pixels in the cyan and magenta separations, respectively, are received at gray level spacing circuit 122 and error propagation circuit 124. Gray level spacing circuit 122 identifies bounding gray levels $L_S(C)$ and $L_B(C)$ that correspond to two of the possible output states (output levels) for the cyan separation and bound the input gray level C(m,n). Similarly, circuit 122 identifies bounding gray levels $L_S(M)$ and $L_B(M)$ that correspond to two of the possible output states (output levels) for the magenta separation and bound the input gray level M(m,n).

Error propagation circuit 124 generates modified gray levels C'(m,n) and M'(m,n) by adding the distributed errors $E_C(m,n)$ and $E_M(m,n)$ to the input gray levels C(m,n) and M(m,n). That is, C'(m,n)=$E_C$(m,n)+C(m,n) and M'(m,n)=$E_M$(m,n)+M(m,n). Level scaling circuit 126 receives the bounding gray levels and the modified gray levels C'(m,n) and M'(m,n) and scales the modified gray levels in relation to the level spacing to obtain scaled gray levels. It has been observed that using gray levels C(m,n) and M(m,n) (or C'(m,n) and M'(m,n)) directly as one would in bi-level vector error diffusion can cause unpredictable behavior and/or undesirable output as the gray level values must really be considered in relation to the possible output levels. Although adjusting the gray levels in relation according to (C(m,n)−$L_S$(C)) and (M(m,n)−$L_S$(M)) can be used if both separations have similar output level spacing (gray level spacings), such scaling could cause undesirable output if the separations are at different output level spacings as the separation with the larger spacing tends to dominate the calculation.

The illustrative embodiment scales the gray levels for the cyan and magenta separations to a common level spacing in relation to their respective gray level spacings. That is, level scaling circuit receives gray levels $L_S(C)$ and $L_B(C)$ for the modified gray level C'(m,n) for the cyan separation. Bounding levels $L_S(C)$ and $L_B(C)$ correspond to two of the possible output states (output levels) for the cyan separation. As the bounding gray levels $L_S(C)$ and $L_B(C)$ define the gray level spacing for cyan input pixel, the modified gray level can be scaled to a common spacing in relation to the gray level spacing of the cyan pixel according to:

$$C_{adj}=(C'(m,n)-L_S(C))*c/(L_B(C)-L_S(C)) \qquad (4)$$

wherein $L_S(C)$ and $L_B(C)$ are the bounding gray levels defining the gray level spacing, C'(m,n) is the modified gray level and c is the number of available gray levels (gray level spacing) in the common level spacing. Similarly, given bounding gray levels $L_S(M)$ and $L_B(M)$ obtained from gray level spacing circuit 122, the modified gray level can be scaled to the common spacing in relation to the gray level spacing of the magenta input pixel according to:

$$M_{adj}=(M'(m,n)-L_S(M))*d/(L_B(M)-L_S(M)) \qquad (5)$$

wherein $L_S(M)$ and $L_B(M)$ are the bounding gray levels for the magenta input pixel, M'(m,n) is the modified gray level, and d is the gray level spacing (number of available gray levels) in the common level spacing.

The scaled gray levels $C_{adj}$ and $M_{adj}$ are supplied to quantization circuit 128 wherein multi-level output signal 130 comprising the multi-level output values $O_C$(m,n) and $O_M$(m,n) is generated based upon a sum of the scaled pixel values $C_{adj}$ and $M_{adj}$ is generated. More specifically, circuit 128 could generate the sum $CM=C_{adj}+M_{adj}$. Given the sum CM, the multi-level output states $O_C$(m,n) and $O_M$(m,n) could be determined according to the following:
if CM<a then $O_C$(m,n)=$L_S$(C) and $O_M$(m,n)=$L_S$(M)
if CM>b then $O_C$(m,n)=$L_B$(C) and $O_M$(m,n)=$L_B$(M)
if (a≦CM≦b) and $C_{adj}$>$M_{adj}$ then $O_C$(m,n)=$L_B$(C) and $O_M$(m,n)=$L_S$(M)
else $O_C$(m,n)=$L_S$(C) and $O_M$(m,n)=$L_B$(M)

wherein typical values for a and b might be 128 and 255, respectively, when d=255. As should be appreciated a different set of thresholds a and b can be used. The selection of thresholds a and b can based upon a number of factors including, for example, output device type (e.g., liquid ink or electrophotographic), device characteristics and ink or toner characteristics.

Error generation circuit 132 generates quantization error values EC and EM for the cyan and magenta separations indicative of the difference between gray levels C(m,n) and M(m,n) of the input pixels and the gray level corresponding to the output level (output state) $O_C$(m,n) and $O_M$(m,n). The determination and distribution (diffusion) of the error can be accomplished using any common error diffusion technique available. Having determined the quantization error, error generation circuit 132 generates weighted fractional portion of the quanitzation error to be distributed or diffused to each of selected group of neighboring pixels. The group of neighboring pixels receiving a weighted error as well as the weighting coefficients can remain constant or be dynamically modified. The weighted fractional portions are often selected such that their sum is one; however, those skilled in the art will recognize that such condition is not necessary.

As described above, image data 108 comprising the yellow separation is processed independently in sub-processor 110. Quantization sub-processor 110, processes pixels within image data 108 using conventional image processing techniques such as scalar quantization, error diffusion or halftoning to generate output signal 112 comprising the output values $O_Y$(m,n) for the yellow separation pixels which may take the form of binary or multi-level output states. As described earlier, independently processing yellow will have minimum affect on overall image quality due to the fact that it has the least visual impact on the image. As should be appreciated, the multi-level error diffusion techniques described above can be used in generating the output values for the yellow separation pixels.

As described above, the multi-level vector error diffusion operation provides an output level corresponding to $L_S$ or $L_B$ for the given separation regardless of the modified gray level. In the embodiment described above, the bounding gray levels $L_S$ and $L_B$ are determined using the input gray level for the current pixel; however, it should be understood that the bounding gray levels can also be determined from the modified gray level for the input pixel. As described above, a number of factors, including for example, other image processing employed (e.g., edge enhancement, anti-aliasing, edge smoothing), image type (e.g., halftone, graphics, text), output device type (e.g., liquid ink or electrophotographic), etc. may impact whether to use the input gray level or the modified gray level to set the bounding gray levels $L_S$ or $L_B$. In general the bounding gray levels that provide the overall desired output quality will be used. The overall desired output quality can be analyzed by generating output image using bounding levels set by the input or the modified gray level with a given output device and image processing options.

Thus, what has been described are systems and methods to extend error diffusion from the binary case to multi-level case with arbitrary output levels. The illustrative examples describe how to extend two such error diffusion techniques, stamp functions and vector error diffusion. In both operations, the amount of correction or adjustment depends on the input pixel value and its relationship to the output range (e.g., the gray level spacing defined by the two gray levels corresponding to possible output states). As the input gray level pixel value varies from a minimum to maximum gray level, the correction term is designed to properly correct the output image. In the multi-level case, there are many output ranges, all of which are much smaller than the difference between maximum and minimum gray levels in the continuous tone image. As taught herein, the same correction term can used, but the input values are scaled such they each vary over the range between two common output levels, the correction varies over the full range of correction terms that would be used for the binary case.

However, the application of the teachings herein for processing image data to generate multi-level image data are not limited to illustrative examples of the stamp functions or vector error diffusion described above. As taught herein, when generating multi-level data having arbitrary levels with arbitrary level spacing, by scaling the value of the input pixel to a common level spacing, such as 0-255, in relation to the arbitrary level spacing in which the input pixel resides, the scaled input data can be treated and processed in the same manner as processing image data with a binary output. Moreover the same processing functions, operations and values can be readily applied to data within each level without regard to the level spacing or output levels.

One skilled in the art would understand that the processors, processing modules and circuits described above can embody or be implemented using a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. Furthermore, specific algorithms may be accomplished using software in combination with specific hardware. In general, any device capable of implementing a finite state machine that is in turn capable of implementing a process, function or operation described above can be used to realize the associated processor or module.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A system for processing color image data including first and second color separations, each color separation including an array of pixels, the system comprising:

a gray level spacing circuit receiving a first input gray level for a first color separation pixel and a second input gray for a second color separation pixel, the gray level spacing circuit identifying first upper and lower bounding gray levels and second upper and lower bounding gray levels, each of the first upper bounding level and first lower bounding level corresponding to one of j multi-level output values for the first color separation wherein 2<j, the first upper bounding level and first lower bounding level defining a range of gray levels that includes the first input gray level and has a first gray level spacing, each of the second upper bounding level and second lower bounding level corresponding to one of k multi-level output values for the second color separation wherein 2<k, the second upper bounding level and second lower bounding level defining a range of gray levels that includes the second input gray level and has a second gray level spacing;

a level scaling circuit receiving a first modified gray level for the first color separation pixel and a second modified gray level for the second color separation pixel, the level scaling circuit scaling the first modified gray level to a common level spacing in relation to the first gray level spacing to generate a first scaled gray level and scaling the second modified gray level to the common level spacing in relation to the second gray level spacing to generate a second scaled gray level; and a quantization circuit receiving the first and second scaled gray levels and deriving a first multi-level output value for the first color separation pixel and a second multi-level output value for the second color separation pixel based on a sum of the first scaled gray level and the second scaled gray level.

2. The system for processing color image data according claim 1, wherein the quantization circuit derives the first and second multi-level output values such that when S is greater than a first threshold and less than a second threshold, if the first scaled gray level is greater than the second scaled gray level, the first multi-level output value corresponds to $L_B(X)$ and the second multi-level output value corresponds to $L_S(Y)$ and if the first scaled gray level is less than the second scaled gray level the first multi-level output value corresponds to $L_S(X)$ and the second multi-level output value corresponds to $L_B(Y)$, wherein S is the sum of the first scaled gray level and the second scaled gray level, $L_S(X)$ is the first lower bounding gray level, $L_B(X)$ is the first upper bounding gray level, $L_S(Y)$ is the second lower bounding gray level and $L_B(Y)$ is the second upper bounding gray level.

3. The system for processing color image data according claim 2, wherein the quantization circuit derives the first and second multi-level output values such that when S is less than the first threshold, the first multi-level output value corresponds to $L_S(X)$ and the second multi-level output value corresponds to $L_S(Y)$ and when S is greater than the second threshold, the first multi-level output value corresponds to $L_B(X)$ and the second multi-level output value corresponds to $L_B(Y)$.

4. The system for processing color image data according claim 3, wherein the first scaled gray level $X_{adj}$ is given by:

$$X_{adj}=(X(m,n)-L_S(X))*d/(L_B(X)-L_S(X))$$

wherein $X(m,n)$ is the first modified gray level and d is the number of available gray levels in the common level spacing.

5. The system for processing color image data according claim 4, wherein the second scaled gray level $Y_{adj}$ is given by:

$$Y_{adj}=(Y(m,n)-L_S(Y))*d/(L_B(Y)-L_S(Y))$$

wherein Y(m,n) is the second modified gray level and d is the number of available gray levels in the common level spacing.

6. The system for processing color image data according claim 2, further comprising an error propagation circuit, the error propagation circuit adding a distributed error for the first color separation pixel to the first input gray level for the first color separation pixel to generate the first modified gray level for the first color separation pixel.

7. The system for processing color image data according claim 2, further comprising an error propagation circuit, the error propagation circuit adding a distributed error for the first color separation pixel to an unprocessed gray level for the first color separation pixel to generate the first input gray level for the first color separation pixel.

8. The system for processing color image data according claim 2, further comprising:
an error propagation circuit, the error propagation circuit adding a distributed error for the first color separation pixel to an unprocessed gray level for the first color separation pixel to generate the first modified gray level for the first color separation pixel;
wherein the gray level spacing circuit adds a portion of the distributed error for the first color separation pixel to an unprocessed gray level to generate the first input gray level for the first color separation pixel.

9. A method for processing color image data comprising at least a first color separation and a second color separation, the first color separation including a first color separation pixel and the second color separation including a second color separation pixel, the method comprising:
identifying a first upper bounding level and a first lower bounding level based on a gray level for the first color separation pixel;
identifying a second upper bounding level and a second lower bounding level based on a gray level for the second color separation pixel;
scaling a first modified gray level for the first color separation pixel to a common level spacing in relation to a first gray level spacing defined by the first upper bounding level and the first lower bounding level to generate a first scaled gray level;
scaling a second modified gray level for the second color separation pixel to the common level spacing in relation to a second gray level spacing to generate a second scaled gray level, the second gray level spacing being defined by the second lower bounding level and the second upper bounding level;
generating a sum S of the first scaled gray level and the second scaled gray level; and
deriving a first output value for the first color separation pixel and a second output value for the second color separation pixel based on the sum S.

10. The method for processing color image data according to claim 9, wherein the first output value is derived such that the first output value is the first multi-level output value that corresponds to the first lower bounding level when the sum S is less than a first threshold, the first output value is the first multi-level output value that corresponds to the first upper bounding level when the sum S is greater than a second threshold, the first output value is the first multi-level output value that corresponds to the first lower bounding level when the sum S is greater than the first threshold and less than the second threshold and the first scaled gray level is less than the second scaled gray level, and the first output value is the first multi-level output value that corresponds to the first upper bounding level when the sum S is greater than the first threshold and less than the second threshold and the first scaled gray level is greater than the second scaled gray level.

11. The method for processing color image data according to claim 9, wherein the second output value is the second multi-level output value that corresponds to the second lower bounding level when the sum S is less than the first threshold, the second output value is the second multi-level output value that corresponds to the second upper bounding level when the sum S is greater than the second threshold, and the second output value is the second multi-level output value that corresponds to the second lower bounding level when the sum S is greater than the first threshold and less than the second threshold and the second scaled gray level is less than the first scaled gray level.

12. The method for processing color image data according to claim 9, wherein the first scaled gray level $X_{adj}$ is given by:

$$X_{adj}=(X(m,n)-L_S(X))*d/(L_B(X)-L_S(X))$$

wherein X(m,n) is the first modified gray level, $L_S(X)$ is the first lower bounding level, $L_B(X)$ is the first upper bounding level, and d is the number of available gray levels in the common level spacing.

13. The method for processing color image data according to claim 9, further comprising adding a distributed error for the first color separation pixel to an input gray level for the first color separation pixel to generate the first modified gray level.

14. The method for processing color image data according to claim 13, wherein the first upper bounding level and the first lower bounding level are based on the input gray level for the first color separation pixel.

15. The method for processing color image data according to claim 13, wherein the first upper bounding level and the first lower bounding level are based on an adjusted gray level, the adjusted gray level being a function of the input gray level for the first color separation pixel and the distributed error.

16. A method for processing color image data including a first color separation pixel and a second color separation pixel, the method comprising:
identifying first upper and lower bounding levels and second upper and lower bounding levels, the first upper and lower bounding levels being based on the first color separation pixel and the second upper and lower bounding levels being based on the second color separation pixel;
scaling an input gray level for the first color separation pixel to a common level spacing in relation to a first gray level spacing to generate a first scaled gray level, the first gray level spacing being defined by the first upper bounding level and the first lower bounding level;
generating a sum S of the first scaled gray level and a second scaled gray level, the second scaled gray level being derived from the second color separation pixel; and
quantizing the input gray level for the first color separation pixel to a first output value based on the sum S.

17. The method of claim 16, wherein the first output value corresponds to the first lower bounding level when the sum S is less than a first threshold, and the first output value corresponds to the first upper bounding level when the sum S is greater than a second threshold, and the first output value corresponds to the first lower bounding level when the sum S is greater than the first threshold and less than the second threshold and the first scaled gray level is less than the second scaled gray level, and the first output value corresponds to the first upper bounding level when the sum S is greater than the first threshold and less than the second threshold and the first scaled gray level is greater than the second scaled gray level.

18. The method of claim 16, further comprising quantizing the input gray level for the second color separation pixel to a second output value based on the sum S; wherein the second output value corresponds to the second lower bounding level when the sum S is less than the first threshold and the second output value is the second multi-level output value that corresponds to the second upper bounding level when the sum S is greater than the second threshold and the second output value is the second multi-level output value that corresponds to the second lower bounding level when the sum S is greater than the first threshold and less than the second threshold and the second scaled gray level is less than the first scaled gray level.

19. The method for processing color image data according to claim 16, further comprising adding a distributed error for the first color separation pixel to an initial gray level of the first color separation pixel to generate the input gray level for the first color separation pixel.

20. The method for processing color image data according to claim 19, wherein the first upper bounding level and the first lower bounding level are based on the initial gray level for the first color separation pixel.

21. The method for processing color image data according to claim 19, wherein the first upper bounding level and the first lower bounding level are based on the input gray level for the first color separation pixel.

22. The method for processing color image data according to claim 19, wherein the first upper bounding level and the first lower bounding level are based on an adjusted gray level, the adjusted gray level being a function of the input gray level for the first color separation pixel and the distributed error.

* * * * *